(12) United States Patent
Chaudhari et al.

(10) Patent No.: US 6,654,089 B2
(45) Date of Patent: Nov. 25, 2003

(54) MASKLESS METHOD AND SYSTEM FOR CREATING A DUAL-DOMAIN PATTERN ON A DIAMOND-LIKE CARBON ALIGNMENT LAYER

(75) Inventors: Praveen Chaudhari, Briarcliff Manor, NY (US); James P. Doyle, Bronx, NY (US); Shui-Chih Lien, Briarcliff Manor, NY (US); Minhua Lu, Mohegan Lake, NY (US); James L. Speidell, Poughquag, NY (US); Robert J. Von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/848,709

(22) Filed: May 3, 2001

(65) Prior Publication Data

US 2002/0163612 A1 Nov. 7, 2002

(51) Int. Cl.$^7$ .............................................. G02F 1/1337
(52) U.S. Cl. ...................... 349/124; 349/123; 349/191
(58) Field of Search ................................. 349/124, 123, 349/191; 204/157.15

(56) References Cited

U.S. PATENT DOCUMENTS

| | | | | | |
|---|---|---|---|---|---|
| 5,576,862 | A | * | 11/1996 | Sugiyama et al. | 349/124 |
| 5,600,459 | A | * | 2/1997 | Roy et al. | 349/42 |
| 5,710,608 | A | * | 1/1998 | Nakabayashi et al. | 349/125 |
| 5,770,826 | A | * | 6/1998 | Chaudhari et al. | 204/157.15 |
| 6,061,115 | A | * | 5/2000 | Samant et al. | 349/129 |
| 6,313,896 | B1 | * | 11/2001 | Samant et al. | 349/124 |
| 6,542,211 | B1 | * | 4/2003 | Okada et al. | 349/130 |

* cited by examiner

*Primary Examiner*—Robert M. Kim
*Assistant Examiner*—Jeanne A. Di Grazio
(74) *Attorney, Agent, or Firm*—Jon A. Gibbons; Fleit, Kain, Gibbons, Gutman, Bongini & Biance P.L.

(57) ABSTRACT

A self-alignment process for the precise alignment in a deposited diamond-like carbon (DLC), which results in a wider viewing angle for the display being manufactured. The process involves ion bombardment, which is swept across the liquid crystal panel in a two-pass process. In one embodiment, both ion sweeps are aligned at a 45-degree angle with respect to the bottom edge of the panel. The first pass is accomplished without any electrical bias on the panel. During the first pass the impinging ions may be at an angle with respect to a point on a plane defined by the surface of the panel that is less than 90 degrees. The second ion sweep is accomplished with the impinging ions at a second angle, greater than 90 degrees up to 180 degrees with respect to the point on the plane defined by the surface.

16 Claims, 5 Drawing Sheets

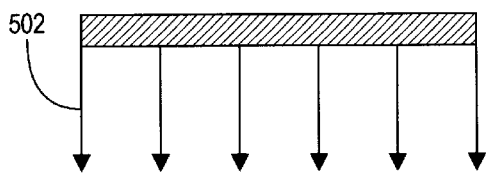
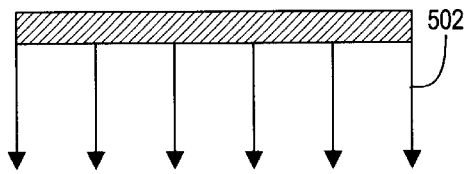
FIG. 5 A          FIG. 5 B
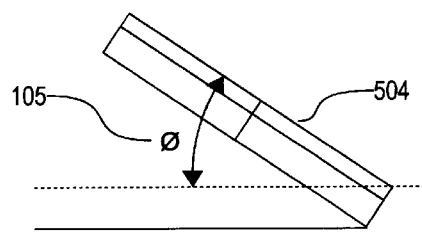
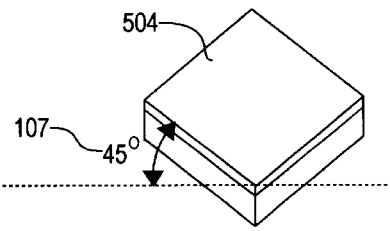
FIG. 5 C          FIG. 5 D
*FIG. 5*

MASKLESS METHOD AND SYSTEM FOR CREATING A DUAL-DOMAIN PATTERN ON A DIAMOND-LIKE CARBON ALIGNMENT LAYER

CROSS REFERENCE TO RELATED APPLICATIONS

Not Applicable

BACKGROUND OF THE INVENTION

1. Field of the Invention

The present invention generally relates to the field of liquid crystal display (LCD) manufacturing. More particularly, the present invention relates to a process and means for increasing the viewing angle of a liquid crystal display by modifying the alignment layer.

2. Description of the Related Art

Liquid crystal displays generally have an alignment layer, which is treated or processed prior to coming in contact with a liquid crystal to produce a preferred direction along which the liquid crystal becomes oriented. Presently, the display industry uses mostly polyimide which is rubbed by a scanning rotating roller to which is attached a special cylindrically draped fibrous cloth. The cloth in turn is in contact with the alignment layer to impart a uniform directionality in the polyimide. The rubbing process physically changes the structure of the polyimide to orient the liquid crystal director vector to position itself in a single uniform direction along the polyimide alignment layer.

Recently, films of diamond-like carbon (DLC) have been used as the alignment layer in place of polyimide as described in U.S. Pat. No. 6,020,946 entitled "Dry processing for liquid-crystal displays using low energy ion bombardment" with inventors Callegari et al., issued Feb. 1, 2000, and is hereby incorporated by reference in its entirety. A scanning ion beam is used to produce the required directionality or orientation of the DLC alignment layer for aligning the liquid crystal. The ion beam is scanned over the diamond-like carbon layer at a beam angle less than 90 degrees with respect to the planar surface of the alignment layer. This type of scanning imparts a preferred direction for the liquid crystal orientation when in contact with the ion beam treated DLC. This method for producing LCD's although useful is not without its shortcoming. One shortcoming is a limited viewing angle of the display. The viewing angle is defined as the angle subtended by the line of sight of the viewer and the normal to the display screen. Accordingly, a need exists to overcome the limited viewing angle shortcoming for LCD's.

Moreover, for both the polyimide and the diamond-like carbon, a twisted nematic type of liquid crystal material has a limited viewing angle when used in a liquid crystal display due in part to the uniform or single domain alignment direction that results from the conventional rubbing of the polyimide or the ion beam scan for DLC. Accordingly, a need exists to overcome the limited viewing angle shortcoming for both polyimide and diamond-like carbon LCD's as well.

SUMMARY OF THE INVENTION

Generally, an alignment layer is used to orient the liquid crystal along a desired direction. For the use of twisted nematic liquid crystal material, there is conventionally a single direction along which the crystal becomes aligned. This configuration, however, suffers from a relatively small viewing angle, that is when the screen is viewed at an angle other than near normal incidence to the screen, the light intensity of the display rapidly decreases. The present invention describes a method for increasing the viewing angle using a diamond-like carbon (DLC) alignment layer or a polyimide alignment layer irradiated with a scanned ion beam to produce more than one direction of liquid crystal alignment. The new process gives rise to a dual-domain structure in the alignment layer instead of the customary single domain. The dual-domain structure greatly enhances the viewing angle of the display.

The increase in intensity enhancement with viewing angle is made possible by creating domains of different directions in the alignment layer. A multi-domain alignment film is one where the liquid crystal will have more than one orientation direction when the display panel is not receiving electrical signals. For example, in a typical dual domain alignment layer, the two liquid crystal directors, that is the vectors that define the orientation direction of the liquid crystal in contact with the alignment layer will lie nearly 180 degrees apart with respect to one another. The angle between the two directions will be $(180°-2\beta)$, where $\beta$ is the angle, usually a few degrees, the director makes with respect to the plane of the alignment layer. This angle $\beta$ is also known in the art as the pre-tilt angle.

The present invention uses an ion beam to scan over a pre-deposited layer of diamond-like carbon (DLC) or other films that can be physically altered by scanning with an ion beam at angle Ø, where Ø is the angle subtended between the direction of the ion beam and the planar surface of the alignment layer. In present day practice a display panel consists in part of a substrate onto which thin film transistors have been deposited. The transistors function to selectively charge and discharge small thin film capacitor plates. Generally these plates are transparent to optical radiation. A second capacitor plate is deposited on a second substrate. It is located in such a manner that when the two substrates are appropriately affixed to one another, the two corresponding plates form a two-plate capacitor, separated from one another by several microns of liquid crystal filling the space between them. The liquid crystal serves as the dielectric of the capacitor. Typical thin film capacitor plates in liquid crystal displays consist of indium tin oxide (ITO), an electrically conducting but optically transparent material. Each capacitor plate on the substrate onto which the alignment layer is deposited is surrounded along in its periphery by gate and data lines which impart the desired electrical bias to the thin film transistor and hence to the corresponding capacitor plate. The voltages impressed on the data/gate lines determine the voltage across the capacitor. This applied voltage will cause a certain amount of rotation of the crystal material between the plates. This acts as a type of window shade which depending on the amount of rotation will allow more or less of the back lighting to pass through.

The combination of liquid crystal, alignment layer, gate/data lines, transistor and thin film capacitor plate constitute a pixel. The thin film capacitor plate is referred to as a pixel electrode. A display panel may have several thousand or even several million independently controlled pixels. A column of pixels is made up of the pixels positioned between two adjacent data lines while a row of pixels consists of pixels positioned between two adjacent gate lines.

To provide a uniform direction for the liquid crystal alignment, an argon ion beam is used for scanning the alignment layer. In other embodiments, ions such as helium, nitrogen, neon, krypton, and xenon are used. The ion beam is partially electrically neutralized by injecting electrons after the ions have been accelerated to the desired energy level through a series of accelerator grids. Thus, the scanning ion beam is very nearly electrically neutral so that there is negligible net charge buildup on the alignment layer. The scanning ion beam has recently been utilized to obtain a unidirectional alignment in DLC films i.e., a single domain orientation for the liquid crystal. It has not been previously disclosed how the ion beam can be utilized to achieve more than a single domain, that is to provide multi-domain alignment conditions. To obtain a dual domain alignment layer as the present invention describes, two separate ion beam scans are required. The first scan is made with no potential impressed on the gate/data lines. This is followed by a second ion beam scan during which the data/gate line voltages cause the thin film transistors to bias alternate rows or columns of thin film capacitors respectively to either positive or negative potentials or to positive and near zero potentials. The second scan over the alignment layer is usually, though not necessarily, made from the opposite direction of the first scan. The result of the second scan is one in which the positively biased pixel or capacitance electrodes repel the oncoming positively charged ions by way of electrostatic repulsion. The alignment layer over the negatively or neutrally biased capacitor electrodes will be reversed or re-written in a direction opposite to the direction resulting from the first ion beam scan. Using this dual scan technique, alternate rows or columns of pixels will have opposite alignment directions. It is also possible to make two or more successive rows or columns of pixels have the same alignment with the next two or more rows or columns with opposite alignment directions by choosing appropriate data/gate line voltages for the respective rows and columns.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

FIGS. 5A–5D is a multiple perspective view illustrating a different method using a flood ion beam exposure, according to the present invention.

DETAILED DESCRIPTION OF AN EMBODIMENT

Figure 1:
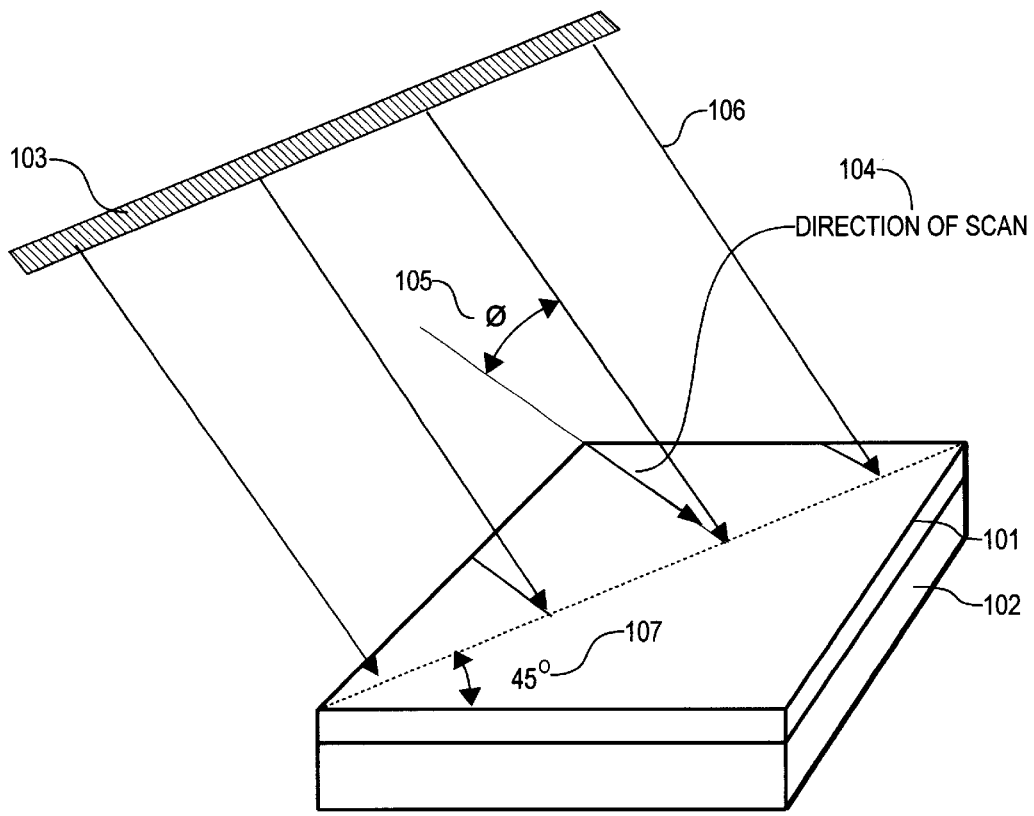
FIG. 1 is an elevational view of an alignment layer on a substrate that is part of a partially assembled liquid crystal display panel and a scanning ion gun whose ion beam is scanned at an angle with respect to the diamond-like carbon (DLC) alignment layer, according to the present invention.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawings like numerals refer to like parts through several views.

The present invention describes processing of an alignment layer composed of diamond-like carbon (DLC), whose final alignment capability for orienting liquid crystal material results from interactions resulting from two separate ion beam scans with the alignment layer. The ion beams are incident on the alignment layer at an angle with respect to the plane of the alignment layer during scanning. It is important to note that a dual structure of the alignment layer is obtained without the use of a lithographic step or the use of a patterning mask of any kind.

Referring to FIG. 1, an ion gun 103 emits an ion beam 106 across the length of an axial gun 103. The thin film circuitry underneath the alignment layer is not shown here for clarity. Ion gun 103 with ion beam 106 is scanned in a direction 104 across a diamond-like carbon alignment layer 101, which has been pre-deposited on substrate 102. In one embodiment the Ion gun beam source is a laser. Note that the direction of the scan is preferably at a 45-degree angle 107 with respect to the bottom edge and other angles are possible. This is known as the angle of rotation for the substrate with respect to the scanning direction. The ion beam 106 subtends an angle Ø 105 with respect to the alignment layer 101. This angle is known as the angle of the impinging ions. The absolute value of angle Ø 105 is less than 90 degrees with respect to a point on a plane defined by the surface. The angle Ø can be zero since the ions emitted from the gun 103 have dispersion, just like water from a hose, which makes even a parallel stream of impinging ions result in strikes against the alignment layer 101. This first scan in the direction 104 indicated after traversing the entire alignment layer 101 causes the liquid crystal (not shown) to attain a single direction of alignment. The first scan is performed with no bias of circuitry of the FIG. 2.

Figure 2:
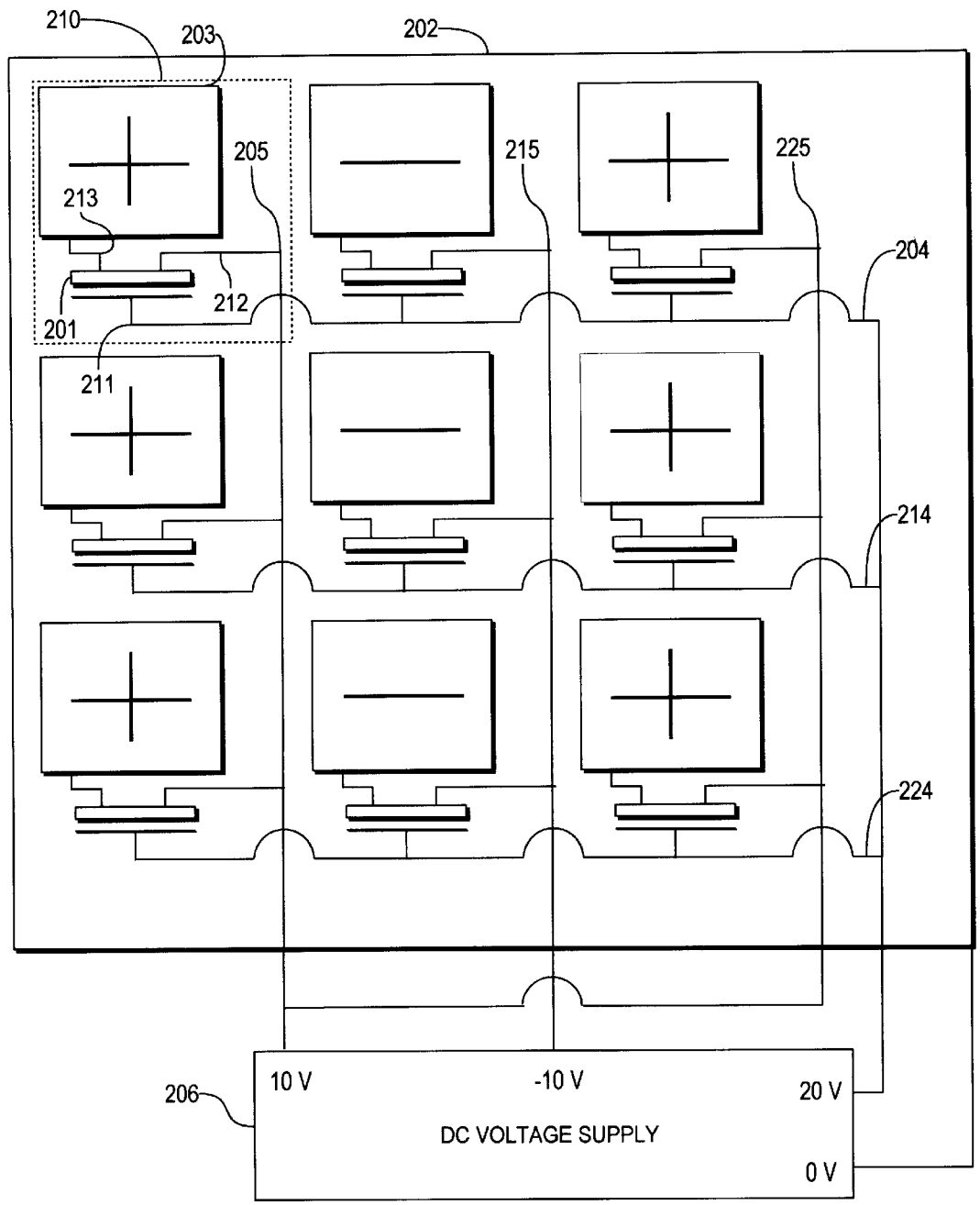
FIG. 2 is schematic of the associated circuitry which includes field effect thin film transistors (FET's) connected to both data/gate lines, thin film capacitor plates, the combination of elements forming an individual display pixel for substrate of FIG. 1, according to the present invention.

A second ion beam scan follows the first in order to change the uniform or single alignment resulting from the first scan to a dual alignment. FIG. 2 shows the thin film display circuitry deposited on substrate 202. This circuitry lies immediately underneath the deposited alignment layer 101 but is not shown in FIG. 1, 3, 4 or 5 for the sake of clarity. Thin film field effect transistor (FET) 201 is shown and represents all transistors on the panel. The transistor 201 is shown connected to a gate line 204 and data line 205 by electrical thin film connections 211 and 212 respectively. Connection 211 connects the gate of transistor 201 to gate line 204 while 212 connect the source of the transistor to the data line 205. Connection 213 electrically attaches the transistor 201 to the thin film plate 203 also referred to as the pixel electrode. This plate will become one side of a capacitor once the LCD is assembled. Thin film plate 203 serves as the drain for transistor 201. A region defined by the intersection of a gate line 204 and data line 205 defines a pixel 210 (dotted block).

A DC voltage Supply 206 is connected to the panel. Appropriate DC voltages are obtained from a DC voltage source for use with the second ion beam scan. All of the gate lines 204, 214 and 224 are connected to 20 Volts. Thus all of the transistors are biased on. The left most data line 205 is connected to 10 Volts. Therefore these transistors will bias the left column of plates positive. The middle data line 215 is biased to −10 Volts. Therefore these transistors will bias this center column of plates negative. Finally the right most data line 225 is also connected to the +10 Volts. Therefore the right column of plates will also be biased positive.

Although a very simple 3×3 example of a LCD circuitry has been illustrated the basic concept here is to bias the transistors on and to supply alternate columns of plates in a positive or negative way. Note that the absolute voltages are intended to be examples of a solution. In addition the alternate columns may in fact be alternated by two or any other pattern that may be considered desirable.

Figure 3:
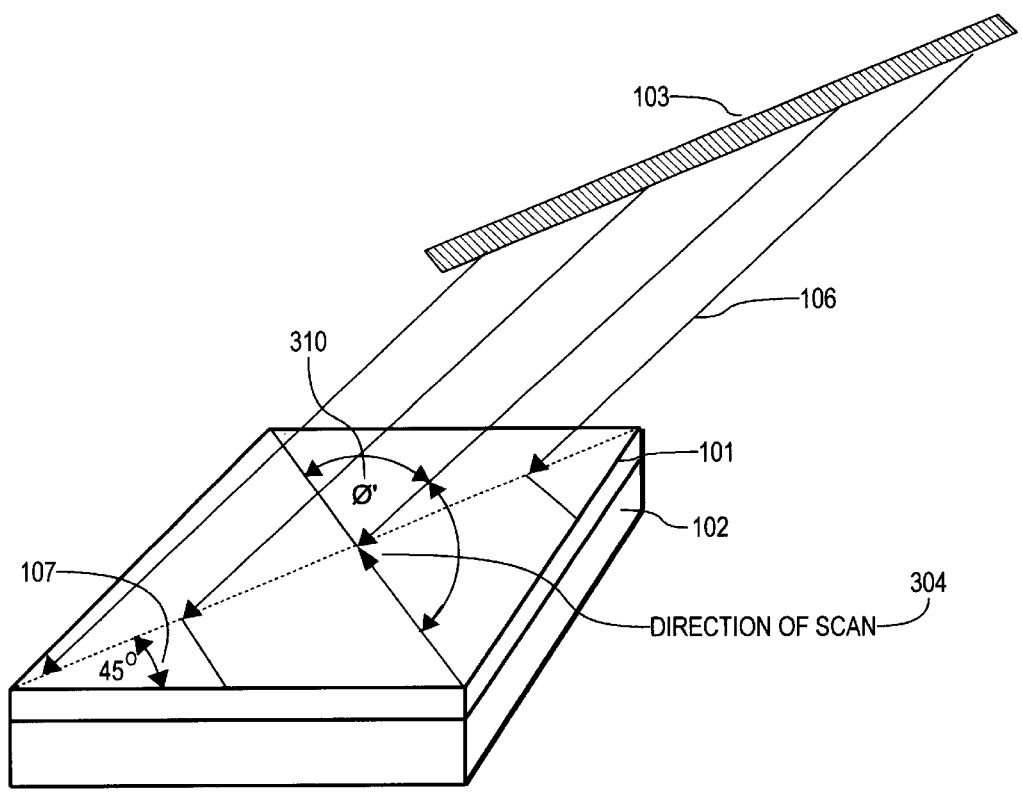
FIG. 3 is an elevational view of an alignment layer on a substrate as shown in FIG. 1, where Ø' is greater than 90 degrees and up to 180 degrees in accordance with the present invention. The scanning is from a direction approximately opposite the direction as illustrated in FIG. 1. In addition the pixels are biased as described in FIG. 2.

Turning now to FIG. 3 shown is an elevation view 300 of the alignment layer 101 on the substrate 102, which illustrates the second ion beam scan of the LCD panel with the biases applied, according to FIG. 2 (not shown). It is important to note, that this second scan is preformed after the appropriate biasing of selected pixel thin film transistors and electrodes of FIG. 2. Here the ion gun 103 scans a newly targeted ion beam 106 across the DLC film 101 (with underlying biasing circuitry shown in FIG. 2 but omitted in FIG. 3 for clarity). Note that the rotation of the substrate with respect to the scanning direction is at a 45-degree angle (preferred direction) 107 with respect to the bottom edge, as it was during the first scan as shown in FIG. 1. Again, it is important to point out, that angles other than 45-degrees are within the true scope and spirit of the present invention. The direction of the scan 304 is now exactly (or approximately) opposite to the direction of scan 104 in FIG. 1. The ion beam angle 310 as measured from the surface of the DLC film 101 is now Ø', where Ø' is greater than 90 and up to 180 degrees. A limit on both angles Ø and Ø' is that their absolute value be less than 90 degrees with respect to the surface of the panel. The result of this second scan will leave the alignment layer 101 deposited under the positively charged capacitor plates 203 unchanged in alignment direction from the first scan direction 104. However the alignment layer 101 covering plates 203 which are negatively charged or grounded (not shown) will have the alignment in those pixels 210 reversed in direction from the alignment obtained from the first scan with ion beam 106 and scan direction 104.

This very precise self-aligned flipping of the pre-tilt angle of the DLC has been achieved without the need for any mask. This is because this second ion beam scans in direction 304 rewrites the alignment layer covering capacitor plates 203 that are charged negatively while not affecting the alignment of capacitor plates 203 that are charged positively. The result of the two scans is to leave the diamond like carbon alignment layer with two opposite domains or directions for aligning a liquid crystal material (not shown).

Figure 4:
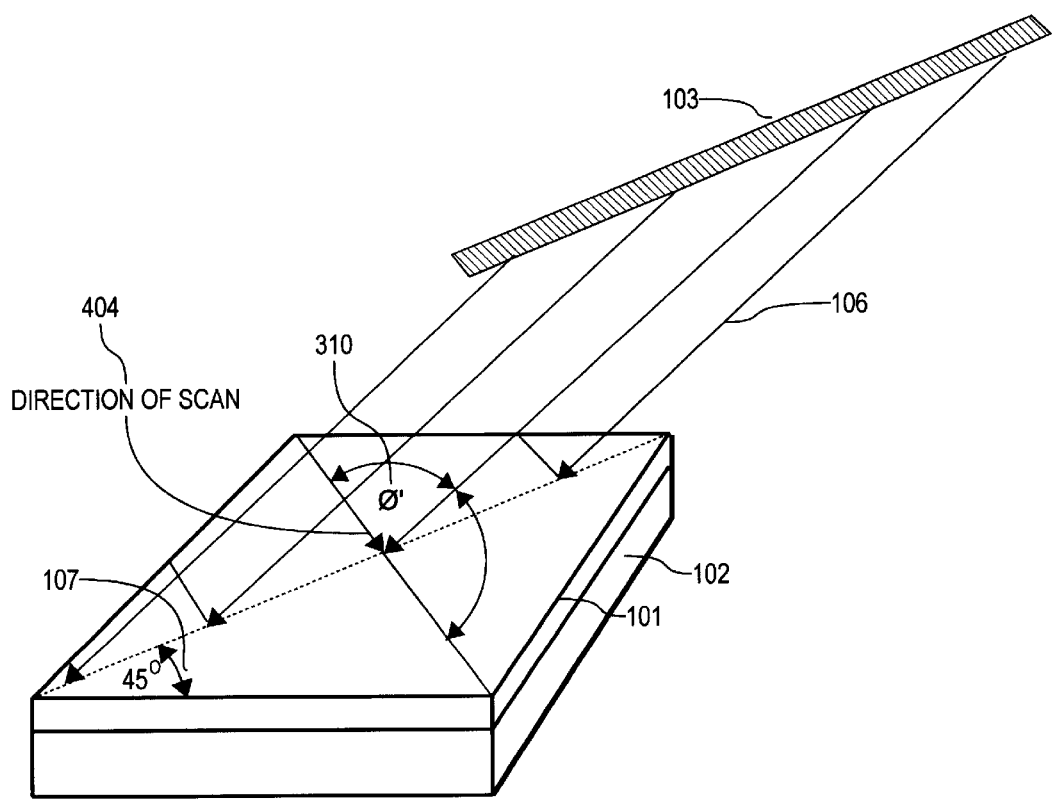
FIG. 4 is an elevational view of an alignment layer on a substrate as show in FIG. 1 and with scanning along the same direction of FIG. 1 but with the ion beam subtending an angle with the alignment layer that is greater than 90 degrees and up to 180 degrees, according to the present invention and the pixels are biased as described in FIG. 2.

Turning now to FIG. 4 is an elevational view of an alignment layer on a substrate as show in FIG. 1 and with scanning along the same direction of FIG. 1 but with the ion beam subtending an angle with the alignment layer that is greater than 90 degrees and up to 180 degrees and the pixels are biased as described in FIG. 2. Note that the alignment of the ion beam scan 103 is at a 45-degree angle 107 with respect to the bottom edge, as it was during the first scan and is shown in FIG. 1.

This alternate second scan with the biases applied can be made by scanning in the same direction 104 as the first scan as illustrated in FIG. 1. However in this case, the angle subtended by the ion beam 106 and the alignment layer surface 101 must be Ø' 310. For this alternate scan process all of the angles are the same as shown in FIG. 3. The only difference being the direction of the scan 404.

Turning now to FIGS. 5A, B, C, and D are multiple views 500 illustrating a different method for the ion beam exposure, according to the present invention. In this embodiment, the ion beam source 502 is now not a line source or slit but is substantially like a blanket source or flood source. In FIG. 5A, a side view of the first exposure illustrates that the surface of the panel 504 is held at an angel relative to the ion source 502. Illustrated is a LCD panel 504, which is being held at a first angle Ø 105 with respect to the support table (not shown). In addition, as shown in FIG. 5B, the panel 504 is held on its point at a 45-degree angle 107. The ion source 502 impinges the panel 504 at the same angle as in FIG. 1. During the first exposure as described in FIG. 1 above, there is no bias voltage applied to the capacitor plate circuitry pre-disposed on the panel 504. In this embodiment, the ion source 502 floods the panel 504 and is not swept, that is, there is no mechanical movement of the ion source 502. Furthermore, in the case of polyimide, the first exposure can be made by light, ion beam or rubbing. The second exposure will be accomplished using an ion beam with biasing of the electrodes as sown in FIG. 2.

FIG. 5C, illustrated a side view of the second exposure of the panel. During the second exposure the panel has the voltage biases applied in accordance with FIG. 2. (not shown). In FIG. 5C, the panel 504 is illustrated tilted in the opposite direction to that of FIG. 5A. The panel 504 is held at an angle as measured from the left horizontal at Ø' 310. This is the same angle that was used for exposure in FIG. 3. Note that this angle can be achieved by tilting the panel 504 relative to a support table (not shown), or by rotating a support table 180 degrees relative to the first exposure. In addition as shown in FIG. 5B, the second exposure in FIG. 5D, the panel 504 is held on its point at a 45-degree angle 107. In this perspective view, the panel 504 is tilted down and away from the viewer. The ion source 502 impinges the panel 504 at the same angle as in FIG. 3. In this embodiment, the ion source 502 floods the panel and is not swept, that is there is no mechanical movement of the source. The result of this alternate process is that there is no physical movement of the ion source. The variable-ability of the rate of scan motion is removed.

It is important to note that the process for creating a multi-domain pattern on an alignment layer as described herein is re-workable. Stated differently, the pattern resulting from the process can be erased and the pre-determined tilt angles of the molecules above each capacitor plate can be repositioned as required.

Non-limiting Examples Shown

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A process for aligning an alignment layer comprising the steps of:

depositing an alignment layer onto a substrate, wherein the substrate comprises a matrix of row, column addressable capacitor plates;

exposing the alignment layer to an initial beam, wherein the beam is positioned to subtending a first angle with respect to a point in a plane defined by a top surface of the alignment layer that is less than 90 degrees;

applying alternately positive and negative voltages to the capacitor plates such that alternate rows or columns of capacitor plates are charged respectively to a positive and negative potential; and exposing the alignment layer to a second ion beam scan, wherein the second ion beam scan is positioned subtending a second angle and wherein the second ion beam scan does not affect the alignment layer covering capacitor plates that are charged to a positive charge.

2. The process according to claim 1, wherein the step of exposing the alignment layer to an the second ion beam scan source at a second angle that is greater than 90 degrees measured from the point in the plane as that of the first scan.

3. The process according to claim 1, wherein the step of exposing the alignment layer to a beam source at a first angle includes exposing the alignment layer to a beam source which is an ion beam source.

4. The process according to claim 1, wherein the step of exposing the alignment layer to a beam source at a first angle includes exposing the alignment layer to a beam source which is an laser beam source.

5. The process according to claim 1, wherein the steps of exposing the alignment layer to an ion beam and a second ion beam scan includes moving an ion source with respect to the substrate held in a stationary position.

6. The process according to claim 1, wherein the steps of exposing the alignment layer to an ion beam and a second ion beam scan includes moving the substrate with respect to the ion source held in a stationary position.

7. The process according to claim 1, wherein the step of exposing the alignment layer to a second ion beam scan includes applying a positive potential to one of the alternative rows or columns of capacitors plates, and applying ground potential to one of the alternative rows or columns of capacitors which are not coupled to the positive potential.

8. The process according to claim 1, wherein the step of depositing an alignment layer includes depositing an alignment layer of diamond-like-carbon (DLC) or polymide.

9. The process according to claim 1, wherein the step of exposing the alignment layer to an ion beam includes exposing the alignment layer to an ion emitting source selected from the group of gas ion emitting sources consisting of an argon ion beam, a helium ion beam, a nitrogen beam, a helium beam, a neon beam, a krypton beam and an xenon beam.

10. A self-aligning process for creating a multi-domain pattern on an alignment layer for a liquid crystal display (LCD) formed from a plurality of LCD molecules, the process comprising the steps of:

disposing an aligning layer on an LCD panel having one or more edges and a top surface and wherein the LCD panel pre-disposed matrix of capacitor plates each with a row and column circuitry for electrically addressing each of the capacitor plates individually;

exposing the LCD panel to an initial beam so that the beam is positioned at an oblique angle with respect to one of the edges of the panel, and that the angle of the ion beam source forms an angle less than 90 degrees with respect to a point on a plane defined by the surface of the panel, whereby at least some of the LCD molecules are set to a predetermined first pre-tilt angle;

biasing the LCD capacitor plates so as to form a pattern of alternate rows and columns of capacitor plates with positive and negative charges; and exposing the LCD panel to the ion beam so that the ion beam is positioned at an oblique angle with respect to the one of the edges of the panel, and that the angle of the ion beam source forms an angle greater than 90 degrees with respect to the point on the plane defined by the surface of the panel, wherein the ion beam does not affect the alignment layer covering capacitor plates that are charged with a positive charge.

11. The self-aligning process according to claim 10, wherein the step of biasing the LCD capacitor plates so as to form a pattern of alternate rows and columns of capacitor plates with positive and negative charges includes biasing the capacitor plates with a ground potential so as to form capacitor plates with a positive potential and a ground potential.

12. The self-aligning process according to claim 10, wherein the step of exposing the LCD panel to the ion beam source results in the capacitor plates with a positive charge to remain at the first pre-tilt angle.

13. The self-aligning process according to claim 10, wherein the steps of exposing the LCD panel to an ion beam source includes exposing the LCD panel to the ion beam so that the ion beam source is positioned at an approximate angle which is 45 degrees.

14. A liquid crystal display (LCD) having a multi-domain pattern on an alignment layer in accordance with the process of claim 10.

15. The process according to claim 1, wherein the initial beam aligns the alignment layer with a first alignment angle and the ion beam aligns areas of the alignment layer that are above the capacitor plates that are charged to a negative potential with a second alignment angle.

16. The process according to claim 1, wherein the capacitor plates are used by a completed LCD assembly.

* * * * *